(12) United States Patent
Zhang et al.

(10) Patent No.: US 10,648,687 B1
(45) Date of Patent: May 12, 2020

(54) SYSTEM AND METHOD FOR RETROFITTING HVAC SYSTEMS

(71) Applicant: Great Lakes Electric, LLC, Saint Joseph, MI (US)

(72) Inventors: Zheng Zhang, Saint Joseph, MI (US); Steve J. Cook, Saint Joseph, MI (US); Ze Jiang, Zhejiang (CN); Yifeng Yu, Zhejiang (CN)

(73) Assignee: Great Lakes Electric, LLC, Saint Joseph, MI (US)

( * ) Notice: Subject to any disclaimer, the term of this patent is extended or adjusted under 35 U.S.C. 154(b) by 0 days.

(21) Appl. No.: 16/416,438

(22) Filed: May 20, 2019

(51) Int. Cl.
*G05B 19/042* (2006.01)
*F24F 11/46* (2018.01)
*F24F 11/77* (2018.01)
*F24F 11/65* (2018.01)
*G05D 9/12* (2006.01)
*F24F 110/10* (2018.01)

(52) U.S. Cl.
CPC .............. *F24F 11/46* (2018.01); *F24F 11/65* (2018.01); *F24F 11/77* (2018.01); *G05B 19/042* (2013.01); *F24F 2110/10* (2018.01); *G05B 2219/25257* (2013.01)

(58) Field of Classification Search
CPC ... G05D 9/12; F24F 11/46; F24F 11/77; F24F 11/65; F24F 2110/10; G05B 19/042; G05B 2219/25257
USPC .......................................................... 700/278
See application file for complete search history.

(56) References Cited

U.S. PATENT DOCUMENTS

| 8,362,725 | B2 | 1/2013 | Becerra et al. | |
|---|---|---|---|---|
| 9,219,398 | B2 | 12/2015 | Woodward | |
| 9,614,468 | B2 | 4/2017 | Hu | |
| 9,806,626 | B2 | 10/2017 | Becerra et al. | |
| 2010/0033119 | A1* | 2/2010 | Becerra | F24F 11/74 318/400.09 |
| 2015/0150200 | A1* | 6/2015 | Abts | A01G 25/092 239/71 |
| 2019/0277527 | A1* | 9/2019 | Muniganti | F24F 11/49 |

* cited by examiner

*Primary Examiner* — Michael J Brown
(74) *Attorney, Agent, or Firm* — Warner Norcross + Judd LLP

(57) ABSTRACT

Systems and method for retrofitting heating, ventilation and air-conditioning (HVAC) systems with a variable speed electronically commutated motor (ECM) are provided. A speed setting controller is adapted to be connected with a furnace main control board and a motor controller, and provides detecting, speed setting, and control functions that are required to operate the ECM.

24 Claims, 8 Drawing Sheets

SYSTEM AND METHOD FOR RETROFITTING HVAC SYSTEMS

BACKGROUND OF THE INVENTION

The present invention generally relates to electronically controlled motor systems and methods for upgrading an existing system to achieve a higher efficiency and comfortable operation for heating, ventilation and air-conditioning (HVAC) applications.

A new generation of motor control technologies have been developed in the past decade and sensorless control of permanent magnet synchronous motor (PMSM) systems have been applied in residential and commercial HVAC blower driven applications. These advanced PMSM systems are often referred to as advanced electronically commutated motors (ECMs) in HVAC applications. Advanced ECMs not only deliver high peak efficiency at rated working speeds, but also have a large high-efficiency operational speed range. For example, an advanced ECM can operate at a rated speed of 1,050 rpm with 89% efficiency, and at a low speed of 300 rpm, its efficiency can be at 70-80%, which can be critical for air circulation in a residential HVAC system.

Conventional HVAC blower motors are fixed speed or multiple speed permanent split capacitor (PSC) AC motors. A typical prior art domestic HVAC system 20 is shown in FIG. 1, and includes a legacy PSC motor 23. The PSC motor 23 has two or more winding taps that offer different operating speeds by reducing the magnetic field amplitudes when powered on with the voltage connections. In a heating or cooling mode of operation, one of the winding taps respective to the operating mode is turned on by a furnace main control board 24 that executes the signals or commands from a thermostat 22. Typically, the operating speed for the cooling mode is different from that for heating mode.

There are two AC voltage level groups of the components of the system 20, 120V and 24V. A power transformer 21 supplies the 24V voltage. The low voltage 24V from the transformer 21 is connected to power on the thermostat 22. Thermostat 22 provides multiple channels of AC voltage 24V signals representing the operational status, such as a high heat mode, or low cooling mode, etc. The signals are sent out through the terminals of a communication port and a cable, such as a multiple-wire cable 25, and can be sensed and detected by the furnace main control board 24. Different types of thermostats sold in market may have two, three, or five operational states or modes, with a three-mode thermostat typically including a heat mode, a fan only mode, and a cooling mode, and a five-mode thermostat typically including a high heat mode, a low heat mode, a fan only mode, a high cooling mode, and a low cooling mode.

The furnace main control board 24 is connected with the 120V voltage as well as the thermostat outputs through the multiple-wire-cable 25. Output wires 26 of the furnace control board 24 have two or four wires depending on the motor speed options, e.g. for a two-speed or four-speed system. The output wires 26 are each connected to a corresponding winding tap of the PSC motor 23.

A drawback of the PSC motor 23 is very low efficiency, such as about 20%, when running at low speed. Since the continuous fan operation for circulation mode is a preference in many households, low speed operation is very common, and so the prior art domestic HVAC system 20 tends to be inefficient overall.

Conventional blower motors, such as PSC motors, are being replaced with variable speed ECM blower systems. Retrofitting a system with a PSC motor to an ECM-based variable speed system creates significant customer benefits, including energy savings and increased comfort. Additionally, HVAC systems with legacy variable speed ECM blower systems have been applied to residential homes in the past decade. Because these legacy ECMs have been in operation for a long time, their expected life is at or close to the end. Such ECMs will need be replaced by a new ECM. These ECMs are variable speed motors, which are programmed to produce a set motor speed based on a thermostat call. Another popular ECM is the X13 motor available from Regal Beloit. The X13 motor is a constant torque motor and is programmed to produce a set motor torque based on the thermostat call.

Some configurations and connection methods have been developed for the replacement of legacy motors in existing HVAC systems. However, these either have complicated connection methods that are not practical for field installers, or have restrictions that limit motor performance, flexibility and customized setup in existing HVAC systems. Another issue particular to retrofitting legacy ECMs is that current ECMs used for retrofitting applications have to be specifically developed with unique software and hardware. These special ECMs add complexity into production and inventory management, which increases costs to the final customer.

SUMMARY OF THE INVENTION

The aforementioned challenges are overcome by the systems and methods of the present invention. The embodiments of this invention provide a practical solution in the applications of retrofitting a PSC motor-driven blower system into an ECM-driven blower system with simplicity and effectiveness.

In one embodiment, a retrofit package for a HVAC system is provided, and includes a speed setting controller adapted to be connected with a furnace main control board and a motor controller. The speed setting controller includes a microcontroller unit, a memory storing a plurality of operational modes and a corresponding motor speed profile for each operational mode, a plurality of input connectors for receiving thermostat output signals, and a communication port for providing speed commands to the motor controller, and is configured to monitor the plurality of input connectors for thermostat output signals, generate a speed command that corresponds to one of the plurality of motor speed profiles stored in the memory based on a thermostat output signal received at one of the plurality of input connectors, and provide the speed command to the motor controller.

In another embodiment, a HVAC system is provided and includes a thermostat configured to generate a thermostat output signal, a furnace main control board coupled with the thermostat, an ECM having a motor controller, and a speed setting controller coupling the furnace main control board to the motor controller.

In yet another embodiment, a method of controlling a HVAC system includes providing a speed setting controller adapted to be connected with a furnace main control board and a motor controller operably connected to an ECM, the speed setting controller including a microcontroller unit and a memory storing a plurality of operational modes and a corresponding motor speed profile for each operational mode, a plurality of input connectors for receiving thermostat output signals from the furnace main control board, and a communication port for providing speed commands to the motor controller, receiving a thermostat output signal at one of the plurality of input connectors, transforming the received thermostat output signal into a speed command that corresponds to one of the plurality of motor speed profiles stored in the memory, and providing the speed command to the motor controller.

Embodiments of the invention provide a retrofit solution to apply or install a variable speed ECM in a domestic HVAC system. These and other features and advantages of the invention will be more fully understood and appreciated by reference to the entire application including the specification, claims, and drawings.

DETAILED DESCRIPTION

Figure 1:
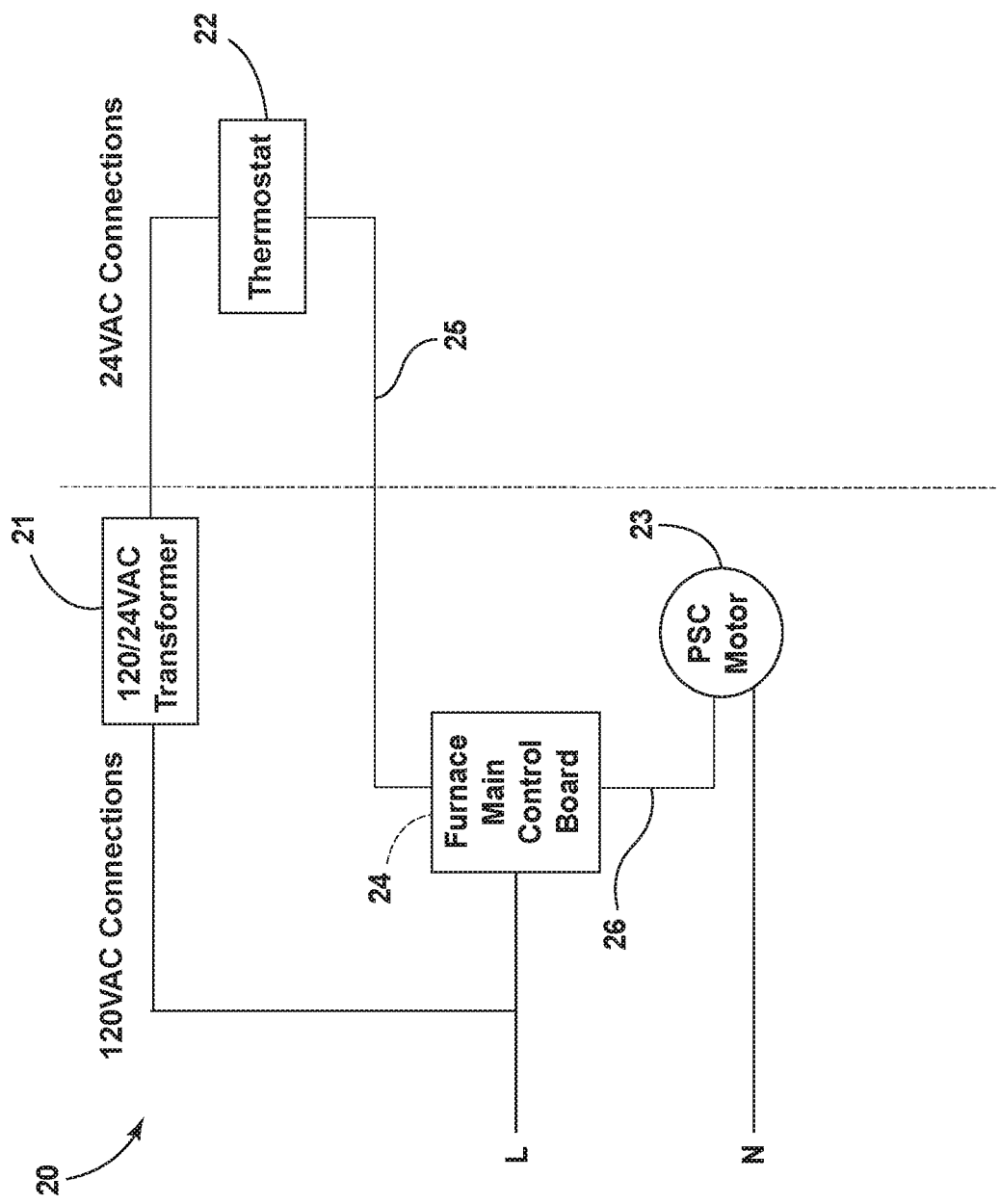
FIG. 1 is a schematic diagram showing a prior art domestic HVAC system having a legacy motor.

The present invention generally relates to electronically commutated motor (ECM) systems and methods to upgrade an existing system to achieve a higher efficiency and comfortable operation for domestic heating, ventilation and air-conditioning (HVAC) applications. Specifically, embodiments of this invention relate to a speed setting (SS-) controller that has a microcontroller and sensing circuits to provide all detecting, speed setting, and controlling functions to operate a variable speed ECM. The SS-controller and the variable speed ECM provide a variable speed motor blower system that can replace a legacy permanent split capacitor (PSC) motor or a legacy ECM, including an X13 motor, in a domestic HVAC system.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. Also, it is to be understood that the phraseology and terminology used herein are for the purpose of description and should not be regarded as limiting. The use of "having," "including," and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

Figure 2:
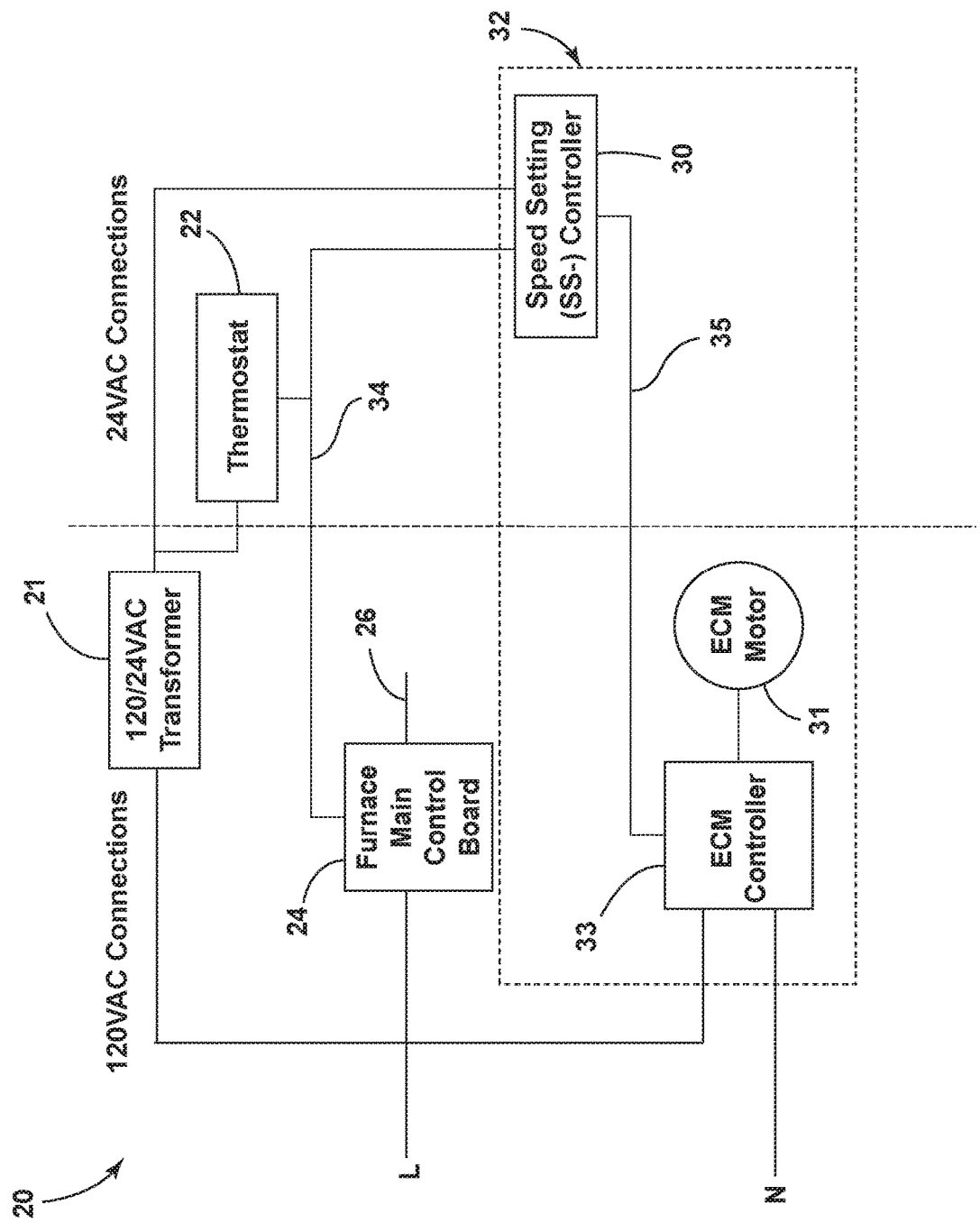
FIG. 2 is a schematic diagram showing a domestic HVAC system having a variable speed ECM and speed setting controller according to one embodiment of the invention.

FIG. 2 shows a schematic diagram of the domestic HVAC system 20 retrofitted with a speed setting (SS-) controller 30 and a blower motor or ECM 31 according to a first embodiment of the invention. The SS-controller 30 can conduct all sensing and detecting functions required by the HVAC system 20 to replace the motor control functionality of the furnace control board 24. It is noted that the furnace control board 24 can retain other control functionality, such as control of any burners or heat pumps of the system.

In one embodiment, the SS-controller 30 and ECM 31 are provided as a retrofit package 32. Alternatively, the SS-controller 30 and ECM 31 can be provided separately. Optionally, first and second cables 34 and 35 can be provided in the retrofit package 32 as well.

The ECM 31 has an ECM controller 33, which may be integrated with the ECM 31. The ECM 31 can include the controller 33 and a permanent-magnet synchronous motor (PMSM) operably coupled with the controller 33. The retrofit ECM 31 can be a conventional or off-the-shelf ECM. The ECM 31 has a communication RTX port to receive speed commands from the SS-controller 30. Such a communication port is a common feature in ECMs. Therefore, when replacing the PSC motor 23 of FIG. 1, it is not necessary to design and manufacture a special ECM to retrofit the PSC motor 23, which saves costs and simplifies inventory management. Similarly, when replacing an X13 motor ECM, it is not necessary to use another costly X13 motor. Rather, in both cases, a conventional and inexpensive ECM can be paired with the SS-controller 30 for the retrofit.

When retrofitting the system 20, the output wires 26 of the furnace main control board 24 are disconnected from the legacy motor 23 (FIG. 1) and are not reconnected to the ECM 31 or ECM controller 33. Instead, a first multiple-wire cable 34 is connected between the furnace main control board 24 and the SS-controller 30. The outputs of the SS-controller 30 are connected to the ECM controller 33 through a second multiple-wire cable 35. The SS-controller 30 takes over the control function of the ECM 31 from the furnace main control board 24. Thermostat signals representing the operational status, such as high heat mode, or low cooling mode, etc., are sent out through the first cable 34 and can be sensed and detected by the SS-controller 30 as well as by the furnace main control board 24.

To simplify installation, the cables 34, 35 can be plug-and-play cables with connectors that plug into the SS-controller 30 and the ECM controller 33. The end of the first cable 34 can have seven wires labeled R, W1, W2, G, Y1, Y2, and C to clearly show the which wire is to be connected to which terminal on the furnace main control board 24. The second cable 35 can also be labeled for easy installation.

It is noted that the first cable 34 can be identical to the cable 25 (FIG. 1) and so in some cases, the cable 25 can be reused in the retrofit system, rather than being replaced. However, in some cases, a longer cable may be required to make the necessary connections, and so a new, longer cable 34 can be provided in the retrofit package 32.

In embodiments where the ECM 31 and ECM controller 33 are integrated together, electrical connections between the ECM controller 33 and ECM 31 are made internally, and any external power and/or other electrical connections are made with the ECM controller 33. In the illustrated embodiment, the ECM controller 33 is connected to the 120V power from the same power connection of the furnace main control board 24, and is connected to the SS-controller 30 via the second multiple-wire-cable 35.

Figure 3:
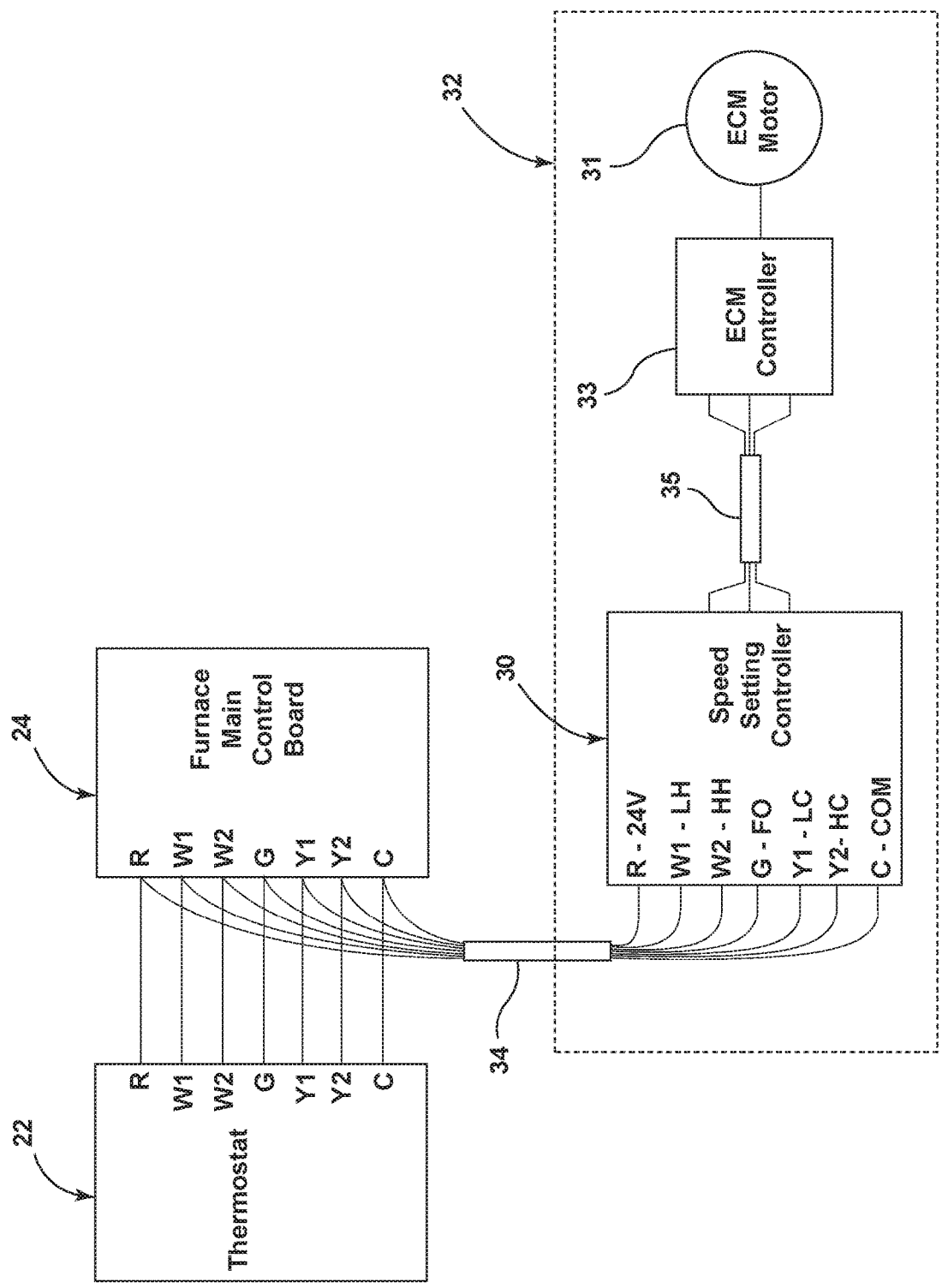
FIG. 3 is a schematic diagram showing the wiring connections for the variable speed ECM and speed setting controller of FIG. 2.

FIG. 3 is a schematic diagram showing the wiring connections for the ECM 31 and SS-controller 30 of FIG. 2. The SS-controller 30 receives the thermostat output signals through the first multiple-wire cable 34, shown herein as a 7-wire cable. The outputs of the SS-controller 30 are connected to the ECM controller 33 through the second multiple-wire-cable 35, shown herein as 3-wire cable. The SS-controller 30 takes over the control function of the ECM 31 from the furnace main control board 24. For example, the SS-controller 30 maps the outputs from the furnace main control board 24 into a set of inputs understood by a conventional ECM 31 in order to provide the desired functionality. Without the SS-controller 30 to take over the control function, the furnace main control board 24 cannot control the ECM 31.

Figure 4:
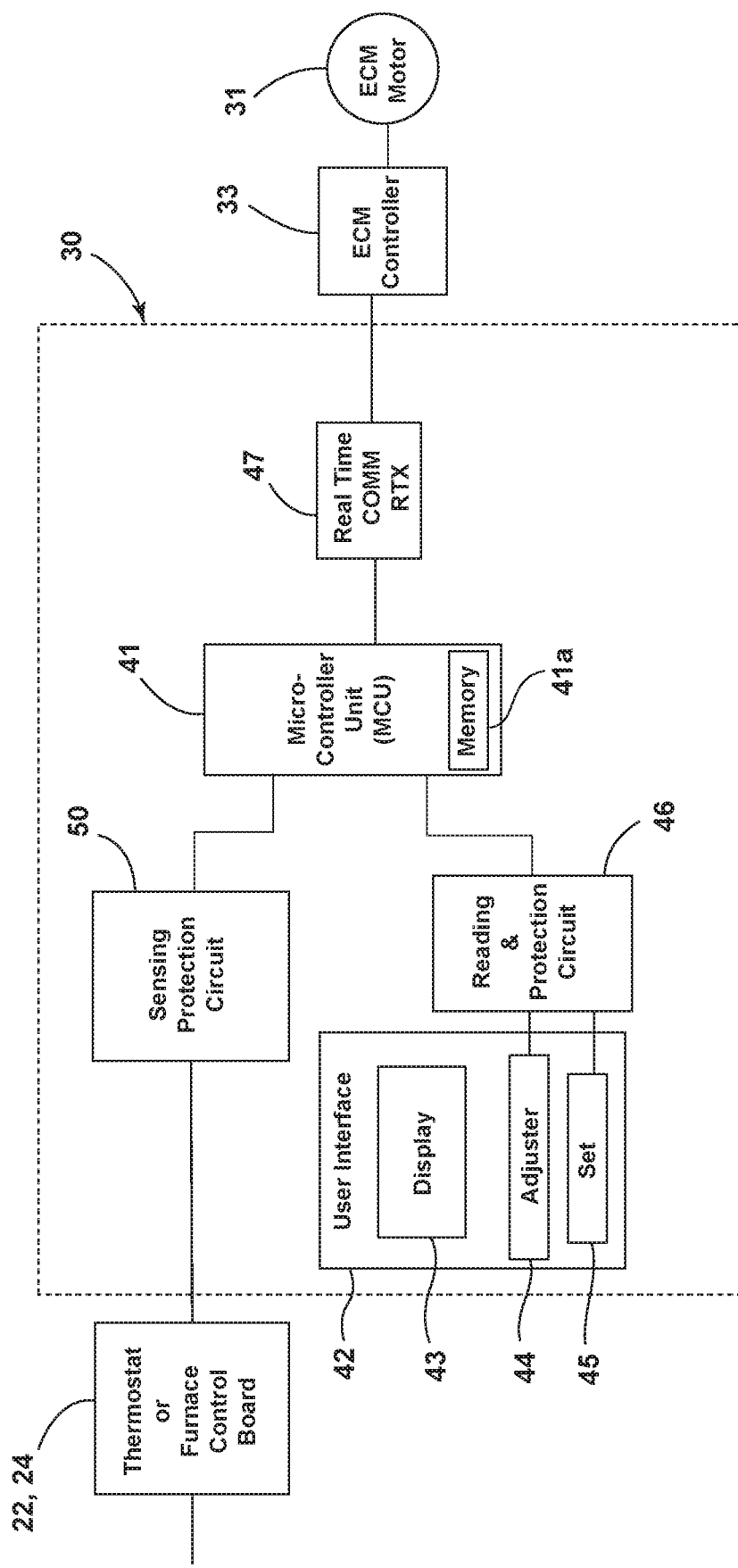
FIG. 4 is a schematic diagram showing at least some of the components of speed setting controller of FIG. 2 and connections with other components of the HVAC system.

FIG. 4 is a schematic diagram showing at least some of the components of the SS-controller 30 and connections with other components of the HVAC system. For simplicity, power connections and components related to power supply to the various components have been omitted. Instead, the schematic emphasizes the data connections and the transformation of the SS-controller inputs to the SS-controller outputs provided to the ECM controller 33. The SS-controller 30 includes a microcontroller unit (MCU) 41 configured to generate instructions based on the input from the thermostat 22 or furnace control board 24 and the motor profile stored in memory 41a. Memory 41a may include an algorithm or programming logic for associating certain inputs with pre-defined or user set speed values. The instructions are transmitted to the ECM controller 33, which in turn controls operation of the ECM 31. For example, the instruction provided to the ECM controller 33 can include a standard format pulse-width modulated signal that indicates a desired motor speed value. The ECM controller 33 can also include a microcontroller unit (MCU) to process and execute the instructions from the SS-controller 30 according to essentially any control algorithm, not shown herein.

The SS-controller 30 can be programmed with a plurality of operational modes and a corresponding motor speed profile for each operational mode. These can be stored in the memory 41a of the SS-controller 30 prior to installation so that the SS-controller 30 is ready for operation after installation. The motor speed profile can include a preset motor speed for each operation mode. The preset motor speeds can be the same as, or different than, the operational mode speeds for the legacy or non-retrofitted system. As explained in more detail below, the preset motor speeds can be calibrated after installing the SS-controller to select an optimal speed to fit each customer's home. Optionally, there are six operational modes that can be implemented by the SS-controller 30 from thermostat output signals, or lack thereof. Table 1 below lists some examples of preset motor speeds for the operational modes, some of which are dependent on the maximum motor speed.

TABLE 1

| Operational Mode | Preset Motor Speed |
|---|---|
| Low heat | 60% of the maximum |
| High heat | 85% of the maximum |
| Fan only | 85% of the maximum |
| Low cooling | 70% of the maximum |
| High cooling | 100% of the maximum |
| Air circulation | 300 rpm |

The air circulation mode is unique to the SS-controller 30; the thermostat 22 is not programmed with this operational mode. The SS-controller 30 can be configured to switch to the air circulation mode when there is no output signal from the thermostat 22 or the thermostat 22 is turned off. For the air circulation mode, the SS-controller 30 provides an air circulation speed command to the ECM controller 33 based on the motor speed profile for the air circulation mode programmed and stored in the MCU 41. In one embodiment, the motor speed profile for the air circulation mode operates the ECM 31 continuously at a low speed to provide a quiet and slow flow of air throughout the home. In one example, the low speed can be about 300 rpm. This operational mode is another benefit of retrofitting a PCS or other legacy motor with the SS-controller 30 and ECM 31.

Upon receiving input from the thermostat/furnace control board 22, 24 indicative of a change in operational mode, the MCU 41 generates an instruction, e.g. a speed command, to transmit to the ECM controller 33 to change the motor speed of the ECM 31. The instruction or speed command can also include a rotational direction of a blower of the HVAC system, as described in more detail below. The content of the instruction to the ECM controller 33 is based on the predefined speed settings or motor speed profiles stored in memory 41a. For example, if the SS-controller 30 receives a thermostat output signal indicative of a user's desire to change to the low heating mode, the MCU 41 queries the memory 41a for the speed setting associated with low heating mode. Then, the MCU 41 prepares an instruction for the ECM controller 33 in a format understood by the ECM controller 33. In the current embodiment, the MCU 41 prepares a signal, e.g. a pulse width modulated (PWM) signal, with a predefined speed setting from memory 41a. Effectively, the SS-controller 30 translates the analog data signal from the thermostat 22 or furnace control board 24 indicating an operational mode into a digital data signal containing a specific speed command for the ECM controller 33. The SS-controller 30 has a communication port 47 to communicate commands from the SS-controller 30 to the ECM controller 33 in a PWM waveform format as speed command in real time. The communication via the communication port 47 can be one-way or two-way. It is worth noting that in the current embodiment, there are two kinds of power systems, a 120V/240V AC power system to run the ECM 31 via a direct line connection and a 5V/3.3V DC power system to provide the speed command to the ECM controller 33 via the SS-controller 30.

The ECM controller 33 can execute the speed command to control the ECM 31 using any suitable control process, including constant speed control or constant torque control. The control process used depends on the software of the ECM controller 33.

Additional control features to operate the furnace can also be programmed in the MCU 41, such as speed ramp up and ramp down, and time delays after receiving calls from the thermostat 22. The SS-controller 30 can be a smart controller that can handle all sensing and control functions necessary to operate the HVAC system, which is different than prior retrofit solutions which require modifications to the software and hardware of the motor controller.

The time delay programmed in the MCU 41 can comprise a predetermined delay period between when the SS-controller 30 receives a call from the thermostat 22 for a particular operation mode and when the SS-controller 30 sends a speed command to the ECM controller 33 for that operation mode. For example, programmed time delay stored in memory 41a can be 15 seconds. It is noted that, when the operational mode calls for heat, the furnace main control board 24 can turn on a burner 62 (FIG. 7) without delay. Using the above example of a 15 second time delay, after receiving a call from the thermostat 22, the burner 62 can fire for 15 seconds before the ECM 31 starts running.

Optionally, in some embodiments, the SS-controller 30 may include a sensing protection circuit 50. In these embodiments, output signals from the thermostat 22 are sensed or detected by the sensing protection circuit 50 that transforms the analog signal from the thermostat 22 into a digital signal. This digital signal is transmitted to the MCU 41 as an input signal. The MCU 41 processes the input signal and generates a speed command for the ECM controller 33 based on an algorithm programmed and stored in the memory 41a, as discussed herein. The MCU 41 also communicates with a user interface 42 of the SS-controller 30, such as providing commands and information to the user interface 42 as well as receiving adjustments and settings input via the user interface 42. The user interface 42 can include a display 43 to show the operational mode of the system, and the real-time motor speed of the ECM 31. The display 43 can comprise a digital display or a graphical user interface or touchscreen. The operational mode and the real-time motor speed of the ECM 31 can be displayed simultaneously on the user interface 42 or can be displayed alternately for predetermined intervals, such as 1-2 seconds.

The user interface 42 of the SS-controller 30 can also have at least one adjuster input control 44 and a set input control 45. The input controls 44, 45 can be provided as buttons, switches, or dials on the user interface 42 that a user physically actuates, or a virtual button on a graphical user interface, such on the display 43. Alternatively or in addition, the user display 24 may be used as a user interface 32 for the appliance, and may be coupled with the controller 30. The input controls 44, 45 are used during a setup operation performed by an installer after retrofitting the HVAC system with the SS-controller 30 and ECM 31. The input controls 44, 45 are used to change the blower rotational direction and the motor speed at which the ECM 31 operates in real time during the setup operation, as described in more detail below.

In one embodiment of the setup operation, to adjust motor speed, the installer presses the set input control 45 twice, and then presses adjuster input control 44 to reach the desired motor speed. The real-time motor speed is displayed to the installer on the display 43 of the user interface 42. When a desired motor speed arrives, the user presses the set input control 45 again to set the speed. Speed setup operation outputs are transferred into the MCU 41 through a reading and protection circuit 46. The new set speed is stored in the memory 41a of the MCU 41 for further use. To provide a confirmation that the new set speed has been stored, the display 43 can show a confirmation message code on the digital tubes 48, such as "OK," for a predetermined time period, such as 2 seconds. After displaying the confirmation message, the display 43 can switch back to the alternating display of the operational status and real-time motor speed.

In one embodiment, the SS-controller 30 is only powered on the low voltage 24V that is under the human safety power voltage. Thus, the installer could complete all the setting process to operate this controller 30 outside the furnace cabinet by having a proper distant wire connection. This saves time and is a significant convenience during installation of the SS-controller 30.

Figure 5:
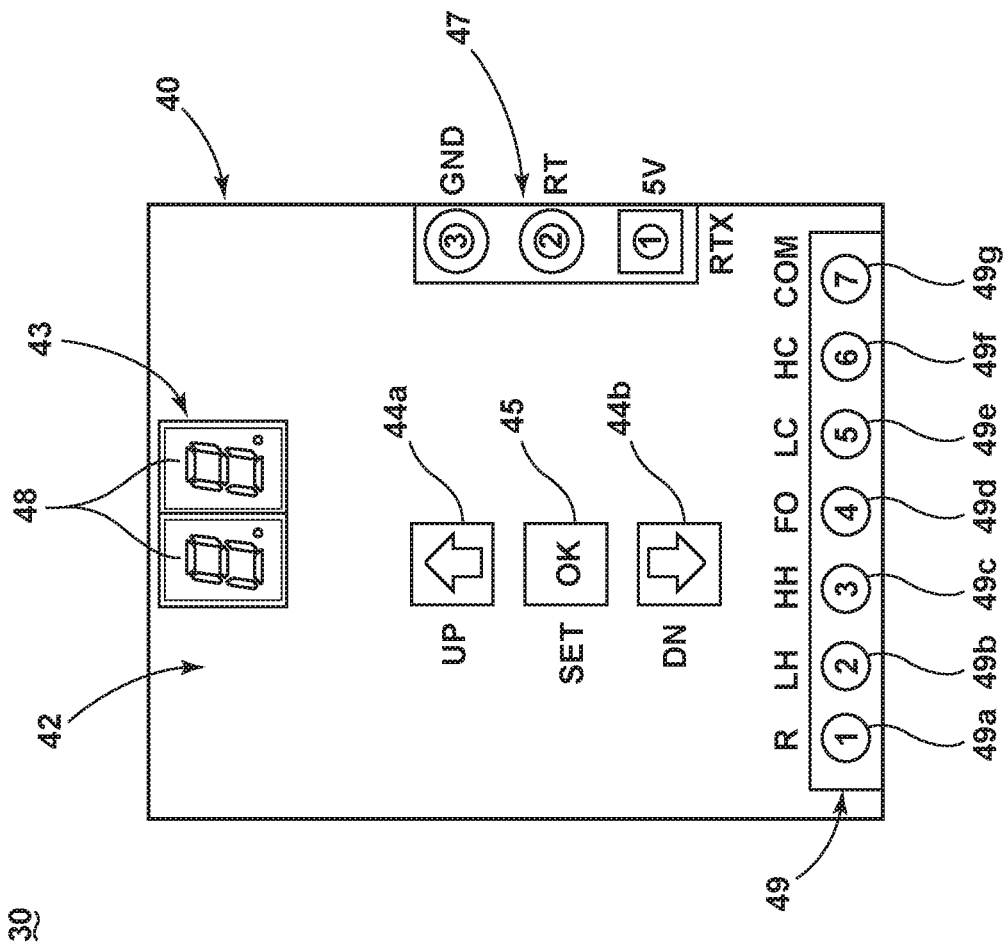
FIG. 5 is a schematic illustration of one embodiment of a user interface for the speed setting controller of FIG. 2.

FIG. 5 is a schematic illustration of one embodiment of the SS-controller 30, including the user interface 42 for the SS-controller 30. The SS-controller 30 includes a housing 40 enclosing and/or protecting one or more components of the SS-controller 30. The user interface 42 and communication port 47 can be provided on the housing 40, with components such as the MCU 41 (FIG. 4) and other circuitry mounted within the housing 40.

The display 43 of the embodiment of the SS-controller 30 shown in FIG. 5 includes two digital tubes 48 which show the operational mode, and the real-time motor speed of the ECM 31. The operational mode and motor speed are alternately displayed by the digital tubes 48 for predetermined intervals, such as 1-2 seconds. The motor speed can be shown on the digital tubes 48 in increments of 100 rpm (e.g. a value of "06" on the digital tubes 48 equals a real-time motor speed of 600 rpm, a value of "12" on the digital tubes 48 equals a real-time motor speed of 1,200 rpm, etc.). The operational mode can be shown on the on the digital tubes 48 as two-letter message codes, some examples of which are shown in the Table 2 below.

TABLE 2

| Operational Mode | Message Code |
| --- | --- |
| Low heat | LH |
| High heat | HH |
| Fan only | FO |
| Low cooling | LC |
| High cooling | HC |
| Air circulation | CL |

The user interface 42 can also have multiple adjuster input controls 44, including a first or up control 44a for increasing motor speed and a second or down control 44b for decreasing motor speed. The input controls 44a, 44b can adjust motor speed in real time. The input controls 44a, 44b can also be used to change the rotational direction of a blower of the HVAC system, as described in more detail below.

In another embodiment, the display 43 can be a touchscreen display, and the input controls 44, 45 can be provided as user-selectable buttons on the touchscreen display.

The SS-controller 30 has multiple individual input connectors 49 for receiving thermostat output signals from the furnace main control board 24 (FIG. 2) via the first cable 34. The output signals are transformed by the SS-controller 30 into a speed command that is transmitted to the ECM controller 33 to cause the ECM 31 to operate in one of a plurality of operational modes. The input connectors 49 may comprise conventional electrical plugs, terminals, sockets, conductors or any other device or mechanism capable of connecting to a wire, cable, or other electrical conductor of the first cable 34.

In one embodiment, the SS-controller 30 has a connection interface provided on the housing 40 including the input connectors 49. Each input connector 49 connects with a coordinating wire of the first cable 34 (FIG. 3) to connect the SS-controller 30 with the thermostat outputs. The sensing protection circuit 50 (FIG. 4) transforms the data analog signals received at the interface into data digital signals. The digital signals are processed by the MCU 41 to generate an appropriate speed command, which is transmitted via communication port 47 to the ECM controller 33 (FIG. 4), optionally using pulse width modulation. The power signals received by the SS-controller 30 can be utilized to power the SS-controller components and can also be conditioned for transmitting a power signal to the ECM controller 33. For example, the 24 VAC signal can be converted to a 5V DC signal.

In the embodiment shown in FIG. 5, the SS-controller 30 has seven connections for receiving seven different signals from the furnace main control board 24, including a power input connector 49a, a low heat input connector 49b, a high heat input connector 49c, a fan only input connector 49d, a low cooling input connector 49e, a high cooling input connector 49f, and a common input connector 49g. Some power signals correspond to different operational statues or modes, including low heat, high heat, fan only, low cooling, and high cooling modes. Table 3 below lists some examples of input connector, their associated signals, and their associated label on the SS-controller 30.

TABLE 3

| Input Connector | Signal | Label |
| --- | --- | --- |
| Power (49a) | Power | R |
| Low heat (49b) | Low heat | LH |
| High heat (49c) | High heat | HH |
| Fan only (49d) | Fan only | FO |
| Low cooling (49e) | Low cooling | LC |
| High cooling (49f) | High cooling | HC |
| Common (49g) | Power | COM |

In the embodiment shown herein, the user interface 42 for the SS-controller 30 is local to the SS-controller 30, and can be physically-implemented on the SS-controller 30 itself. In other embodiments, the user interface 42 can be remote from the SS-controller 30, and more particularly can be remote from the housing 40 enclosing and/or protecting one or more components of the SS-controller 30. The user interface 42 can be provided additionally or alternatively on a smartphone or other handheld device, with the SS-controller 30 wirelessly communicating with the smartphone or other handheld device. For example, the SS-controller 23 can comprise a Blue-Tooth (BT) device, and can communicate with a smartphone of the installer to complete the setup of the retrofit system. The user can interact with the user interface 42 provided on the remote device in the same way as the wired counterpart described above, with communication between the remote device and the SS-controller 30 occurring wirelessly.

Figure 6:
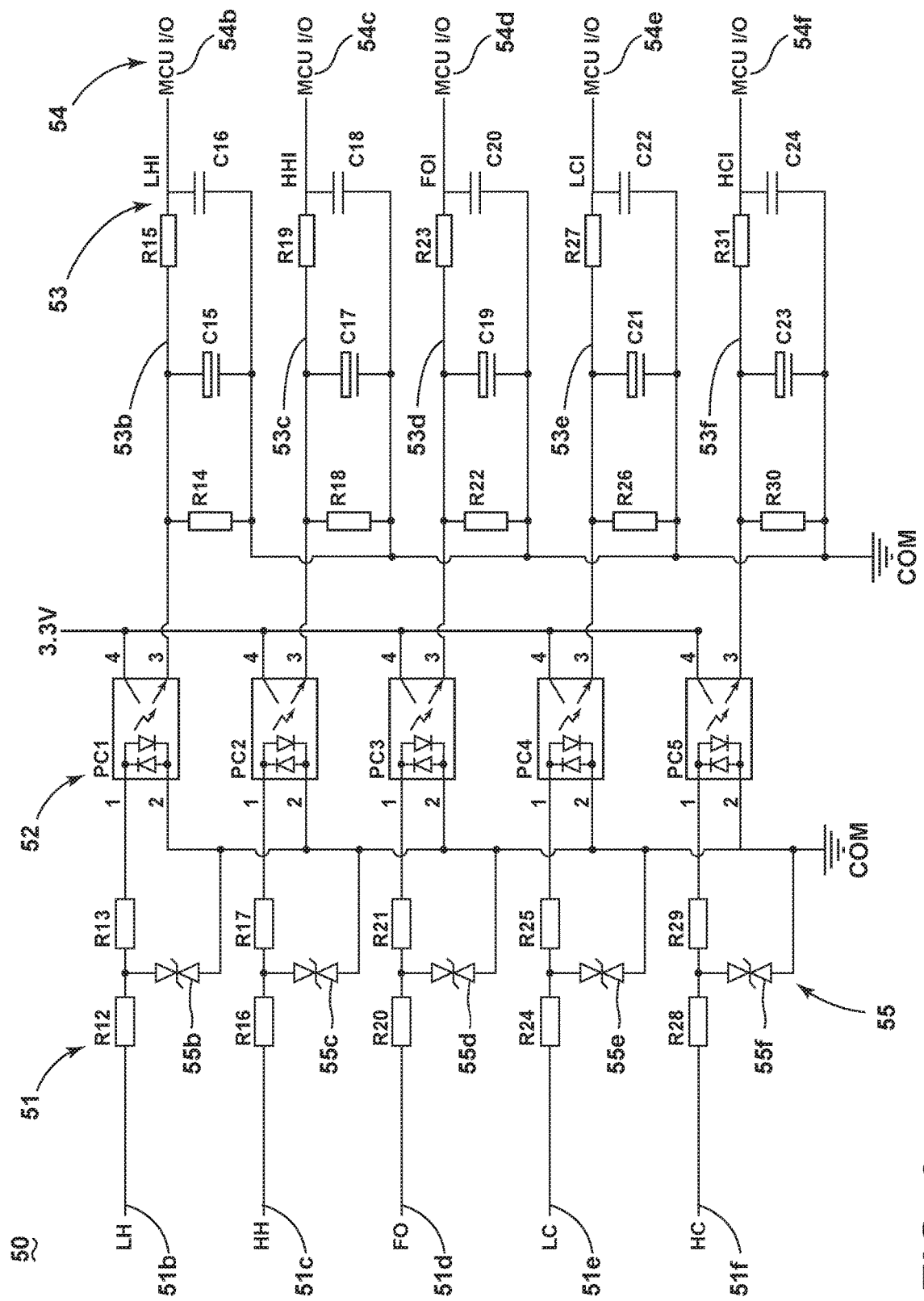
FIG. 6 is a schematic circuit diagram showing one embodiment of a sensing protection circuit for the speed setting controller of FIG. 2.

FIG. 6 is a schematic circuit diagram showing one embodiment of the sensing protection circuit 50 for the SS-controller 30 in detail. The SS-controller sensing protection circuit 50 has a plurality of data input channels 51 to detect different output signals from the thermostat 22 corresponding to the various operational modes, including a low heat (LH) input channel 51b, a high heat (HH) input channel 51c, a fan only (FO) input channel 51d, a low cooling (LC) input channel 51e, and a high cooling (HC) input channel 51f. Each input channel 51 is connected to a respective input connector 49b-49f. Each input channel 51 is in electrical communication with one of a plurality of MCU I/O ports 54, including a LH I/O port 54b, a HH I/O port 54c, a FO I/O port 54d, a LC I/O port 54e, and a HC I/O port 54f. The sensing protection circuit 50 converts each analog 24 VAC voltage data signal from the thermostat 22 to a digital 3.3 VDC voltage data signal, as an output, that is connected to one of the MCU I/O port 54 for control purposes. Put simply, the sensing protection circuit 50 converts the analog data signals from the thermostat 22 into digital data signals compatible with the MCU 41.

The sensing protection circuit 50 is robust and can accommodate for extreme working conditions during installation of the SS-controller 30, such as thunder or any surges from magnetic field impact. The depicted embodiment of the sensing protection circuit 50 in FIG. 6 includes three sub-circuits: protection circuits 51, optocouplers 52, and signal shaping circuits 53.

Each of the data input channels 51 includes a pair of resistors and a transient-voltage-suppression (TVS) diode 55 (also referred to as a transil or thyrector), connected as depicted in FIG. 6. For example, the resistor R12, R13, and TVS 55b comprise a protection circuit for the LH input channel 51b. In the current embodiment, the R12, R16, R20, R24, R28 resistors may be 2.7K Ohm and the R13, R17, R21, R25, and R29 resistors may be 2K Ohm. Further, each data input channel 51 includes a TVS diode: LH TVS diode 55b, HH TVS diode 55c, FO TVS diode 55d, LC TVS diode 55e, and HC TVS diode 55f. Accordingly, the protection circuits protect the SS-controller 30 from voltage spikes induced on connected wires. Optocouplers 52 (e.g., PC1 to PC5) can be used to isolate the input channels 51 from these impacts. The protection circuits and the optocouplers 52 can protect the circuitry downstream, such as the MCU, from a surge voltage up to 5,000V.

The sensing protection circuit 50 can optionally include signal shaping circuits 53 for filtering the output signals from the thermostat 22 to improve the quality of signals to the MCU I/O port 54. The digital DC signals provided to the MCU 41 can be utilized for real-time control of the ECM 31. Each input channel 51 can have an associated signal shaping circuit 53, including a LH signal shaping circuit 53b, a HH signal shaping circuit 53c, a FO signal shaping circuit 53d, a LC signal shaping circuit 53e, and a HC signal shaping circuit 53f.

Figure 7:
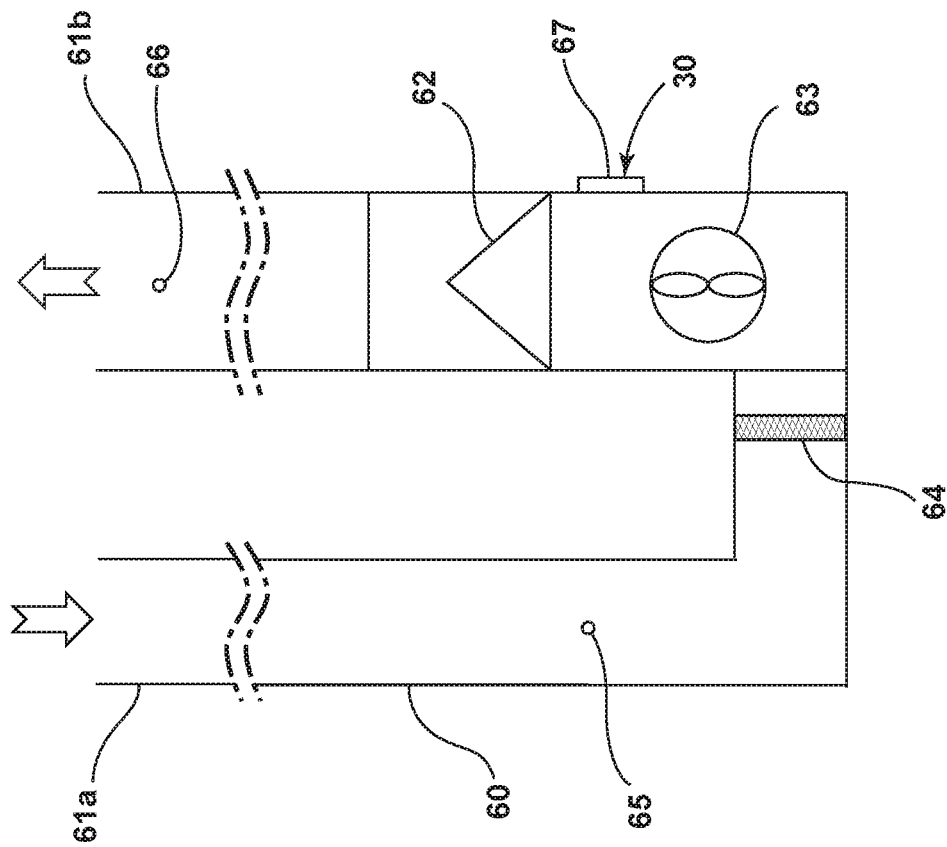
FIG. 7 is a schematic illustration of a furnace system retrofitted with the speed setting controller of FIG. 2.

FIG. 7 is a schematic illustration of a furnace system retrofitted with the SS-controller 30. The furnace system includes ductwork 60 having an airflow inlet 61a and an airflow outlet 61b, with a blower 63 located within the ductwork 60 between the inlet 61a and outlet 61b. A filter 64 can located fluidly upstream of the blower 63 to filter inlet airflow prior to reaching the blower 63. In operation, the airflow passes into ductwork 60 through the airflow inlet 61a, and then through the filter 64. The blower 63 pushes airflow through a burner 62 and the airflow outlet 61b.

Prior to retrofitting, the blower 63 is driven by the PSC motor 23 (FIG. 1) or other legacy motor. After retrofitting, the blower 63 is driven by the ECM 31 (FIGS. 2-4). The SS-controller 30 can optionally be mounted at position 67 outside of the ductwork 60. Other locations for the SS-controller 30 are possible.

Before replacing a legacy motor, the installer can evaluate the furnace conditions to verify the air flow rates or the total airflow value set for each operational mode. In one example, the evaluation can include measuring the temperature difference upstream and downstream of the burner 62. The installer forms, i.e. drills, two testing holes 65, 66 in the ductwork 60, including a first testing hole 65 upstream of the blower 63 and a second testing hole 66 downstream of the blower 63. The location of the first testing hole 65 can more specifically be 2 to 3 feet upstream of the filter 64 and the location of the second testing hole 66 can more specifically be 2 to 3 feet downstream of the burner 62. The diameter of the testing holes 65, 66 can be less than 2 mm, depending the head size of the thermal probe.

Next, the HVAC system is turned on, and one of the operational modes (e.g. low heat, high heat, fan only, low cooling, or high cooling) is selected on the thermostat 22. Once the furnace reaches a stable operation, the temperature is measured at the first and second testing holes 65, 66 using a thermal probe. The difference between the temperatures measured should fall within a predetermined range specific to the operational mode. For example, for the high heat mode, the temperature difference should fall within the range of about 50-70° F., and for the high cooling mode, the temperature difference should fall within the range of about 15-20° F. This test is repeated for each operational mode of the thermostat 22, with the installer recording the temperature difference values for each operational mode for use when retrofitting the furnace with the SS-controller 30 and ECM 31. Other methods for evaluating the furnace conditions to verify the air flow rates or the total airflow value set for each operational mode are possible. The evaluated furnace conditions can be utilized to adjust the SS-controller settings during installation such that the total airflow values for each operational mode are similar to the measured legacy values. Alternatively, the evaluation can be skipped and the SS-controller settings can be adjusted during the retrofit installation to ensure the post-installation airflow values fall within the recommended or predetermined ranged for each operational mode.

Figure 8:
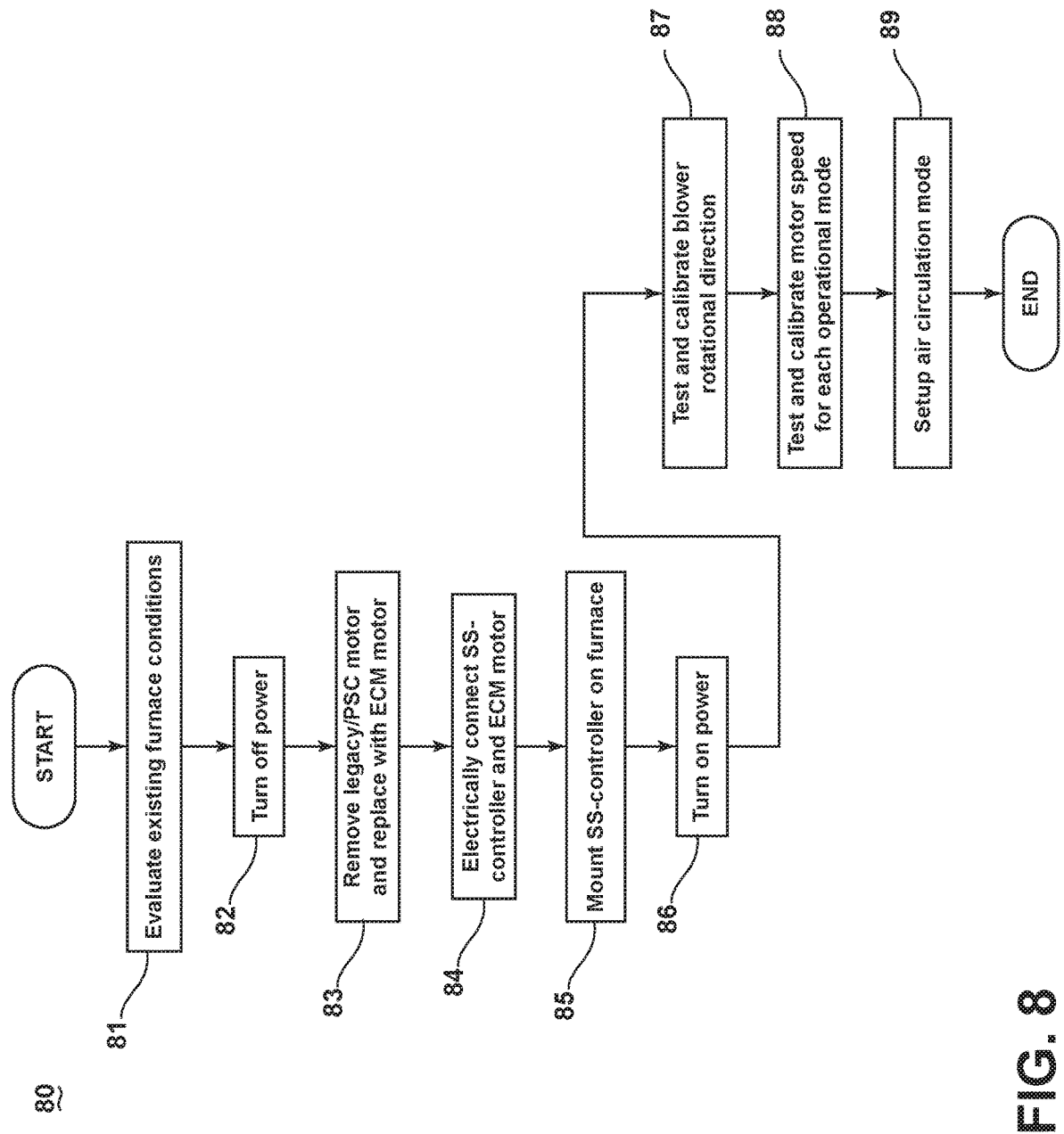
FIG. 8 is flow chart showing a method for retrofitting a domestic HVAC system having a legacy motor, such as a PSC motor, with the variable speed ECM and speed setting controller of FIG. 2.

A method of retrofitting a domestic HVAC system having a legacy motor, such as a PSC motor or other legacy motor, with the SS-controller 30 and ECM 31 can include: (1) evaluating the existing furnace unit; (2) installing the SS-controller 30 and ECM 31 in place of the legacy motor of the furnace unit; (3) testing and calibrating the blower rotational direction setting for the system; (4) testing and calibrating the motor settings for each operational mode of the system; and (5) setting up the air circulation mode of the system. FIG. 8 is a flow chart showing one embodiment of such a method 80. The sequence of steps discussed is for illustrative purposes only, and is not meant to limit the method 80 in any way as it is understood that the steps may proceed in a different logical order, additional or intervening steps may be included, or described steps may be divided into multiple steps, without detracting from the embodiment of the method 80 described herein.

The method 80 begins with step 81, with an evaluation of the existing furnace conditions, specifically to verify the air flow rates for the different operational modes (e.g. low heat, high heat, fan only, low cooling, or high cooling) of the system. The evaluation can include the testing as described above with reference to FIG. 7. During the evaluation, the installer can record the test results for each operational mode for reference during later steps of the method 80. Other methods for evaluating the furnace conditions to verify the air flow rates or the total airflow value set for each operational mode are possible at step 81.

After the evaluation is complete, at step 82 the main power of the furnace system is turned off.

Next, at step 83 the PSC motor 23 or other legacy motor is removed and replaced with the ECM 31. When removing the PSC motor 23 at step 83, the output wires 26 are disconnected the from the furnace main control board 24 and can be capped if needed. The PSC motor 23 is unmounted from a blower frame or other location within the furnace, and removed. As the ECM 31 is replacing an existing component, the ECM 31 can be physically mounted in generally the same location and in the same manner as the removed PSC motor or other legacy motor, such as mounting the ECM 31 in the blower frame. For an ECM 31 that includes an integrated ECM controller 33, mounting the ECM 31 also accomplishes mounting of the ECM controller 33. In cases where a non-integrated ECM controller 33 is used, step 83 can also include separately mounting the ECM controller 33.

At step 84, all electrical connections for the SS-controller 30 and ECM 31 are completed. The SS-controller 30 is connected to the furnace main control board 24 by the first cable 34 and the integrated ECM 31 and motor controller 33 are connected to the SS-controller 30 by the second cable 35. The ECM controller 33 is also connected to mains power as shown in FIG. 2.

As part of step 84, the installer can verify that all connections are correctly and securely made, including confirming that each wire of the first cable 34 is correctly connected to the appropriate input connectors 49 of the SS-controller 30. Since the SS-controller 30 is powered with only 24V voltage, the installer can safely operate it.

Next, at step 85 the SS-controller 30 can be mounted outside of the furnace as shown in FIG. 7, such as on an outside wall of the furnace cabinet outside wall close to the furnace door. The cables 34, 36 can be long enough to accommodate for this mounting location of the SS-controller 30. The SS-controller 30 can alternatively be mounted later or at the end of the retrofitting method 80.

At step 86, the main power of the furnace system is turned back on. With power back on to the furnace system, all of the elements of the furnace system are powered on, including the thermostat 22, furnace main control board 24, SS-controller 30, ECM 31, and ECM controller 33.

Once powered, the SS-controller 30 detects a call from the thermostat 22 and sends a speed command to the ECM 31 to run at the preset motor speed for the currently selected operational mode. For example, if the thermostat 22 is currently set to the high heat mode, the SS-controller 30 detects the high heat output signal from the thermostat 22 and outputs a speed command to the ECM controller 33 to run at the preset motor speed for the high heat mode. The speed command can be transmitted as a PWM digital signal to the ECM controller 33. After a ramp-up period (such as, for example, 10, 15 seconds, etc., depending on the desired speed ramp up rate), the ECM 31 reaches the preset motor speed for the selected operational mode. Continuing the example of the high heat mode, the preset motor speed can be, for example, 85% of the maximum speed of the ECM 31. During this, the display 43 shows the operational mode (e.g. "HH" for the high heat mode) and the actual or real-time motor speed as described above with reference to FIG. 5.

Next, at step 87, the installer can test and calibrate the rotational direction setting for the blower 63 (FIG. 7) of the retrofitted system. Blowers have two possible rotational directions, clockwise (CW) or counterclockwise (CCW), depending on the perspective. With the SS-controller 30, the rotational direction of the blower 63 can be changed from CW to CCW, or vice versa. With the ECM 31 running, the installer can evaluate the operation of the blower 63 and determine if the rotation direction setting should be changed.

To change the rotational direction setting for the blower 63, the installer presses the set input control 45 twice, and then presses both adjust input controls 44a, 44b simultaneously. The current rotational direction setting is displayed to the installer on the display 43 of the user interface 42. For example, the display 43 can show a message code on the digital tubes 48, such as "CW," for the clockwise rotational direction setting and "CC" for the counterclockwise rotational direction setting. To change the setting, the installer can press the first or up control 44a twice, with the display 43 showing the updated setting. When the rotational direction setting is displayed, the user presses the set input control 45 again to set the rotational direction. The new rotational direction setting is stored in the memory 41a of the MCU 41 for further use. To provide a confirmation that the new rotational direction setting has been stored, the display 43 can show a confirmation message code on the digital tubes 48, such as "OK," for a predetermined time period, such as 2 seconds. After displaying the confirmation message, the display 43 can switch back to the alternating display of the operational status and real-time motor speed. After a new rotational direction is confirmed and saved, the ECM 31 coasts down to zero, and start up again to run in the new rotational direction.

At step 88, the installer can test and calibrate the motor speed setting for each operational mode (e.g. low heat, high heat, fan only, low cooling, or high cooling) of the retrofitted system. As described above, the MCU 41 of the SS-controller 30 can be programmed with all of the operational modes, a corresponding preset motor speed for each operational mode, speed ramps, and delay times.

As part of step 88, the installer can calibrate the motor speed setting for the currently selected operational mode for the particular furnace conditions using data from the evaluation performed during step 81 and/or using data from a new evaluation perfomed as part of step 88. To calibrate the motor speed setting, the installer can evaluate the air flow rate for the current operational modes, which can include the testing as described above with reference to FIG. 7, and can compare this data to the data from the evaluation performed during step 81 to determine if the preset speed setting requires adjustment. Other methods for evaluating the preset speed setting are possible at step 88.

If the preset speed setting needs to be adjusted, the installer changes the preset speed setting to a new speed setting, for example using the controls 44a, 44b, 45 and process described above with reference to FIG. 5. The updated speed setting is stored in the memory 41a of the MCU 41 as the new set motor speed for the operational mode.

Once the speed setting for the currently selected operational mode is appropriately calibrated, the installer selects another operational status to test and calibrate. The installer can test each operational mode of the system by cycling through all operational modes at the thermostat 22. The calibration is also repeated as necessary for each operational mode.

Depending on the season or weather conditions during the retrofitting, the testing and calibration of the motor speed settings may be limited for certain operational modes. For example, during winter, testing and calibration of the cooling modes may not be accurate. Similarly, during summer, testing and calibration of the heat modes may not be accurate. The installer can compensate for this based on the relative speeds listed in Table 1 (above) during installation.

Once all operational modes have been tested and, if necessary, calibrated, the installer moves on to step 89 and sets up the air circulation mode of the retrofitted system. As detailed above, the air circulation mode is unique to the SS-controller 30. To begin set up, the thermostat 22 is turned off; as such, no thermostat output signals is received by the SS-controller 30. The SS-controller 30 will automatically switch to the air circulation mode, and run the ECM at a preset low speed for air circulation. In one example, the preset speed for the air circulation mode can be about 300 rpm. During this, the display 43 shows the operational mode (e.g. "CL" for the air circulation mode) and the actual or real-time motor speed as described above with reference to FIG. 5.

The preset air circulation speed can adjusted as appropriate for the home or building. As part of step 89, the installer can calibrate the motor speed setting for the air circulation mode. To calibrate the motor speed setting, the installer tests the airflow of some registers in different rooms around the house or building. If the speed setting needs to be adjusted, the installer changes the preset speed setting to a new speed setting, for example using the controls 44a, 44b, 45 and process described above with reference to FIG. 5. The updated speed setting is stored in the memory 41a of the MCU 41 as the new set motor speed for the air circulation mode. Optionally, to turn off or bypass the air circulation mode of the SS-controller, the motor speed setting for the air circulation mode can be set to 0 rpm.

It is noted that while the illustrated method 80 shows the air circulation mode being set up after testing and calibrating the other operational modes, the air circulation mode can alternatively be set up prior to, or during, the testing and calibration of the other operational modes.

After motor speeds for each operational modes, including the air circulation mode, have been selected and stored, the SS-controller 30 is ready for operational control of the HVAC system and the retrofitting operation is complete. The installer can optionally cycle through each operational mode one more time to verify the setup and speed operations.

In another embodiment of the method 80, particularly where the ECM controller 33 is configured to execute speed commands to control the ECM 31 using constant torque control, at step 88, torque values corresponding to each of the operational modes can be established and saved in the memory of the ECM controller 33. When an updated speed setting is stored in the memory 41a of the MCU 41 as the new set motor speed for one of the operational modes, the ECM controller 33 will record the torque value corresponding to the new set motor speed, and saves the torque values in its memory. In practice, the torque-controlled ECM 31 may then run within a range of speeds based on the saved torque value, rather than one motor speed saved in the memory 41a of the SS-controller 30. This can advantageously keep airflow unchanged or substantially unchanged when airflow resistance changes, such as when the air filter 64 (FIG. 7) accumulates dust and adds resistance to airflow through the ductwork 60. When the airflow resistance increases, the ECM 31 automatically increases its speed to maintain the preset torque, which maintains the airflow through the HVAC system.

There are several advantages of present disclosure arising from the various aspects or features of the apparatus, systems, and methods described herein. For example, aspects described above provide a retrofit solution to install an ECM in a domestic HVAC system. The present disclosure provides a speed setting (SS-) controller that provides all detecting, speed setting, and control functions to operate the ECM. This eliminates the need for complex or specially-designed ECMs, and offers simple inventory management and a lower cost solution. The retrofitting solution is applicable to replace both PSC motors and old ECMs.

Another advantage of aspects of the disclosure relates to the flexibility of programming and modifying motor speed profiles and blower rotational direction. The SS-controller is programmed with a plurality of operational modes and a corresponding motor speed profile for each operational mode, and has a user interface though which an installer can customize the speed profiles and blower rotational direction for optimal performance of the retrofitted system.

Yet another advantage of aspects of the disclosure relates to the provision of an air circulation mode. The air circulation mode is unique to the SS-controller, as legacy HVAC systems are not necessarily provided with this operational mode. When no output signal is received from the thermostat, the SS-controller automatically operates the ECM continuously at a low speed to provide a quiet and slow flow of air throughout the home.

Still another advantage of aspects of the disclosure relate to the streamlined installation method. Legacy retrofit solutions are either too complicated and time-consuming, or restrict the performance of the HVAC system. The SS-controller is easily incorporated into existing HVAC systems. The provision of plug-and-play cables that plug into the SS-controller and the ECM controller save the installer time, and help ensure the components are installed correctly.

The above description is that of current embodiment(s) of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A retrofit package for a heating, ventilation and air-conditioning (HVAC) system having a thermostat and a furnace main control board, the retrofit package comprising:
   a speed setting controller adapted to be connected with the furnace main control board and a motor controller, the speed setting controller comprising:
   a microcontroller unit;
   a memory storing a plurality of operational modes and a corresponding motor speed profile for each operational mode;
   a plurality of input connectors for receiving thermostat output signals from the furnace main control board; and
   a first communication port for providing speed commands to the motor controller;
   a low voltage power input connector for receiving low voltage power;
   wherein the speed setting controller is configured to exclusively receive low voltage power;
   wherein the speed setting controller is configured to:
   monitor the plurality of input connectors for thermostat output signals;
   generate a speed command that corresponds to one of the plurality of motor speed profiles stored in the memory based on a thermostat output signal received at one of the plurality of input connectors; and
   provide the speed command to the motor controller.

2. The retrofit package of claim 1, whereby an electronically commutated motor (ECM) comprising the motor controller is adapted to receive power from a first power system, and wherein the speed setting controller is adapted to receive power from a second power system, different from the first power system, via the low voltage input connector.

3. The retrofit package of claim 2, wherein the first power system is a direct line connection.

4. The retrofit package of claim 2, wherein the first power system is at least one of a 120V AC power system and a 240V AC power system.

5. The retrofit package of claim 2, wherein the ECM is adapted to receive power from the first power system without power being routed through the speed setting controller to the ECM.

6. The retrofit package of claim 2, wherein the second power system is a step down transformer adapted to receive power from the first power system.

7. The retrofit package of claim 2, wherein the second power system is a low voltage 24 VAC power system.

8. The retrofit package of claim 2, wherein the second power system is a low voltage power system for providing power to the thermostat.

9. The retrofit package of claim 2, wherein the first power system is a high voltage power system and the second power system is a low voltage power system.

10. The retrofit package of claim 1, wherein the speed setting controller is adapted for installation external to a furnace cabinet of the HVAC system and wherein the speed setting controller comprises a user interface having a plurality of input controls and a display.

11. The retrofit package of claim 10, wherein the speed setting controller is absent any high voltage power input connectors and absent any high voltage power output connectors.

12. The retrofit package of claim 10, wherein the speed setting controller is connected to the HVAC system by a low voltage distant wire connection such that risk of harm to a user of the user interface of the speed setting controller is substantially reduced relative to a hypothetical high voltage distant wire connection.

13. A heating, ventilation and air-conditioning (HVAC) system, comprising:
   a thermostat configured to generate a thermostat output signal;
   a furnace main control board coupled with the thermostat;
   an electronically commutated motor (ECM) comprising a motor controller, wherein the ECM is adapted to receive power from a first power system;
   a speed setting controller coupling the furnace main control board to the motor controller, the speed setting controller comprising:
   a microcontroller unit;
   a memory storing a plurality of operational modes and a corresponding motor speed profile for each operational mode;
   a plurality of input connectors coupled with the furnace main control board for receiving thermostat output signals from the furnace main control board; and
   a first communication port coupled with the motor controller;
   a low voltage power connector adapted to receive power from a second power system, different from the first power system, wherein the second power system provides lower voltage than the first power system;

wherein the speed setting controller is configured to:
receive power without exceeding a human safety power voltage threshold;
monitor the plurality of input connectors for thermostat output signals; generate a speed command that corresponds to one of the plurality of motor speed profiles stored in the memory based on a thermostat output signal received at one of the plurality of input connectors; and
provide the speed command to the motor controller.

14. The heating, ventilation and air-conditioning (HVAC) system of claim 13, wherein the speed setting controller comprises:
a housing enclosing the microcontroller unit; and
a user interface having a plurality of input controls and a display;
wherein the user interface and the plurality of input connectors are provided on the housing;
wherein the speed setting controller is adapted for installation external to a furnace cabinet of the HVAC system.

15. The HVAC system of claim 14 wherein the speed setting controller is configured to:
receive a user input command to adjust a motor speed of the ECM via at least one of the plurality of input controls;
provide a speed command to the ECM in accordance with the user input command to adjust the motor speed;
display, on the display of the user interface, real-time motor speed;
receive a user input command to change a preset motor speed for the one of the plurality of motor speed profiles to the adjusted motor speed as a new speed;
updating the one of the plurality of motor speed profiles stored in the memory with the new speed.

16. The HVAC system of claim 13 wherein the first power system is a high voltage power system and the second power system is a low voltage power system.

17. The HVAC system of claim 13 wherein the speed setting controller is connected to the second power system by a distant wire connection such that risk of harm to a user of the speed setting controller is substantially reduced relative to a hypothetical distant wire connection from the first power system, wherein the speed setting controller is absent any high voltage power input connectors and wherein the speed setting controller is absent any power output connectors for coupling power to the ECM.

18. The HVAC system of claim 13 wherein the ECM is adapted to receive power from the first power system without power being routed through the speed setting controller to the ECM.

19. A method of controlling a heating, ventilation and air-conditioning (HVAC) system, the method comprising:
providing a speed setting controller adapted to be connected with a furnace main control board and a motor controller operably connected to an electronically commutated motor (ECM), the speed setting controller including a microcontroller and a memory storing a plurality of operational modes and a corresponding motor speed profile for each operational mode, a plurality of input connectors for receiving thermostat output signals from the furnace main control board, and a communication port for providing speed commands to the motor controller;
mounting the speed setting controller outside the furnace, wherein the speed setting controller is safely accessible to a user during operation of the HVAC without physical access to the ECM;
receiving a thermostat output signal at one of the plurality of input connectors;
transforming the received thermostat output signal into a speed command that corresponds to one of the plurality of motor speed profiles stored in the memory; and
providing the speed command to the motor controller.

20. The method of claim 19, comprising:
receiving, at a user interface of the speed setting controller mounted outside the furnace, a user input command to adjust a motor speed;
providing a speed command to the motor controller in accordance with the user input command to adjust the motor speed;
displaying, on a display of the user interface, real-time motor speed;
receiving, at a user interface of the speed setting controller, a user input command to change a preset motor speed for the one of the plurality of motor speed profiles to the adjusted motor speed as a new speed;
updating the one of the plurality of motor speed profiles stored in the memory with the new speed;
saving the one of the plurality of motor speed profiles as an updated motor speed profile in the memory;
transforming the received thermostat output signal into a new speed command that corresponds to the updated motor speed profile; and
providing the new speed command to the motor controller.

21. The method of claim 19 including connecting a low voltage power supply to the speed setting controller and connecting a direct line power connection to the ECM, including at least one of a 120V AC power source and a 240V AC power source.

22. The method of claim 19 wherein the speed setting controller is connected to the HVAC system by a low voltage distant wire connection such that risk of harm to a user of the user interface of the speed setting controller is substantially reduced relative to a hypothetical high voltage distant wire connection.

23. The method of claim 19, including routing power to the ECM without routing the power through the speed setting controller.

24. The method of claim 19, including connecting a step down transformer to the speed setting controller to provide low voltage power to the speed setting controller.

* * * * *